United States Patent
Ward

(10) Patent No.: US 8,181,982 B1
(45) Date of Patent: May 22, 2012

(54) ADJUSTABLE MOTORCYCLE FOOT REST ASSEMBLY

(76) Inventor: Carolyn M. Ward, Webb City, MO (US)

( * ) Notice: Subject to any disclaimer, the term of this patent is extended or adjusted under 35 U.S.C. 154(b) by 0 days.

(21) Appl. No.: 12/855,776

(22) Filed: Aug. 13, 2010

(51) Int. Cl.
*B62J 25/00* (2006.01)
(52) U.S. Cl. ............................ 280/291; 74/564; 280/163
(58) Field of Classification Search .................. 280/291, 280/304.3, 304.4, 163; 74/564
See application file for complete search history.

(56) References Cited

U.S. PATENT DOCUMENTS

| | | | |
|---|---|---|---|
| 1,476,592 A * | 12/1923 | Carlson | 74/564 |
| 4,174,852 A | 11/1979 | Panzica et al. | |
| D338,643 S | 8/1993 | Fuller et al. | |
| 5,713,591 A * | 2/1998 | Zarkhin et al. | 280/250.1 |
| D395,024 S | 6/1998 | Baratti | |
| 6,623,022 B2 * | 9/2003 | Malassigne et al. | 280/250.1 |
| D485,790 S | 1/2004 | Sprague | |
| 6,893,038 B2 | 5/2005 | Egan | |
| 7,025,369 B1 | 4/2006 | Sine | |
| 7,431,118 B1 | 10/2008 | Hogg | |
| 2005/0241547 A1 | 11/2005 | Colano | |
| 2007/0057484 A1* | 3/2007 | Gilman | 280/291 |
| 2010/0127474 A1* | 5/2010 | Jans | 280/291 |
| 2010/0175942 A1* | 7/2010 | Griep et al. | 180/90.6 |

* cited by examiner

*Primary Examiner* — Anne Marie M Boehler

(57) ABSTRACT

An adjustable motorcycle foot rest assembly for providing improved foot support and comfort to a user includes an arm member and an arm attachment assembly coupled to a first end of the arm member. The arm attachment assembly is designed for coupling to a motorcycle. A foot rest attachment assembly is pivotally coupled to a second end of the arm member. A foot rest member is coupled to the foot rest attachment assembly.

11 Claims, 4 Drawing Sheets

ADJUSTABLE MOTORCYCLE FOOT REST ASSEMBLY

BACKGROUND OF THE DISCLOSURE

1. Field of the Disclosure

The disclosure relates to motorcycle foot rests and more particularly pertains to a new motorcycle foot rest for providing improved foot support and comfort to a user.

2. Summary of the Disclosure

An embodiment of the disclosure meets the needs presented above by generally comprising an arm member and an arm attachment assembly coupled to a first end of the arm member. The arm attachment assembly is designed for coupling to a motorcycle. A foot rest attachment assembly is pivotally coupled to a second end of the arm member. A foot rest member is coupled to the foot rest attachment assembly.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
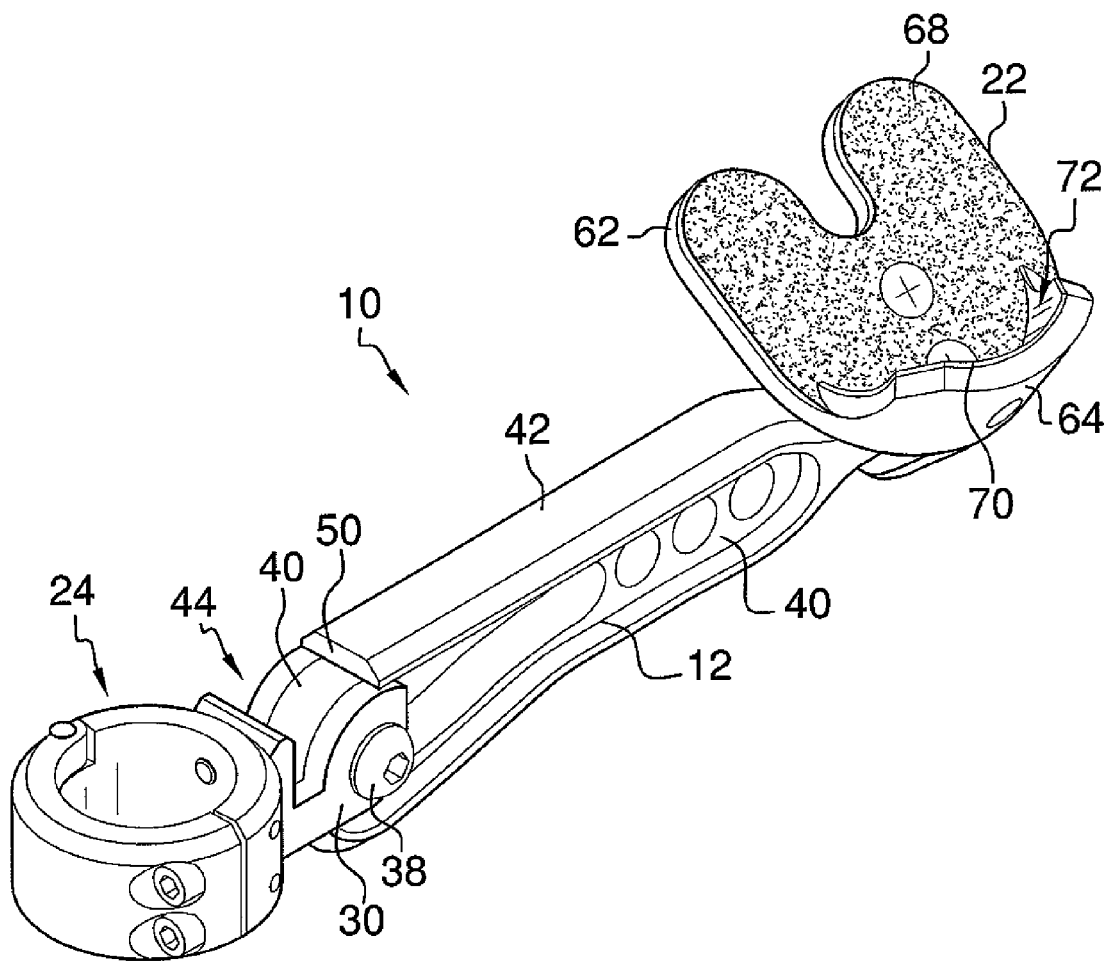
FIG. 1 is a front top side perspective view of an adjustable motorcycle foot rest assembly according to an embodiment of the disclosure.
Figure 2:
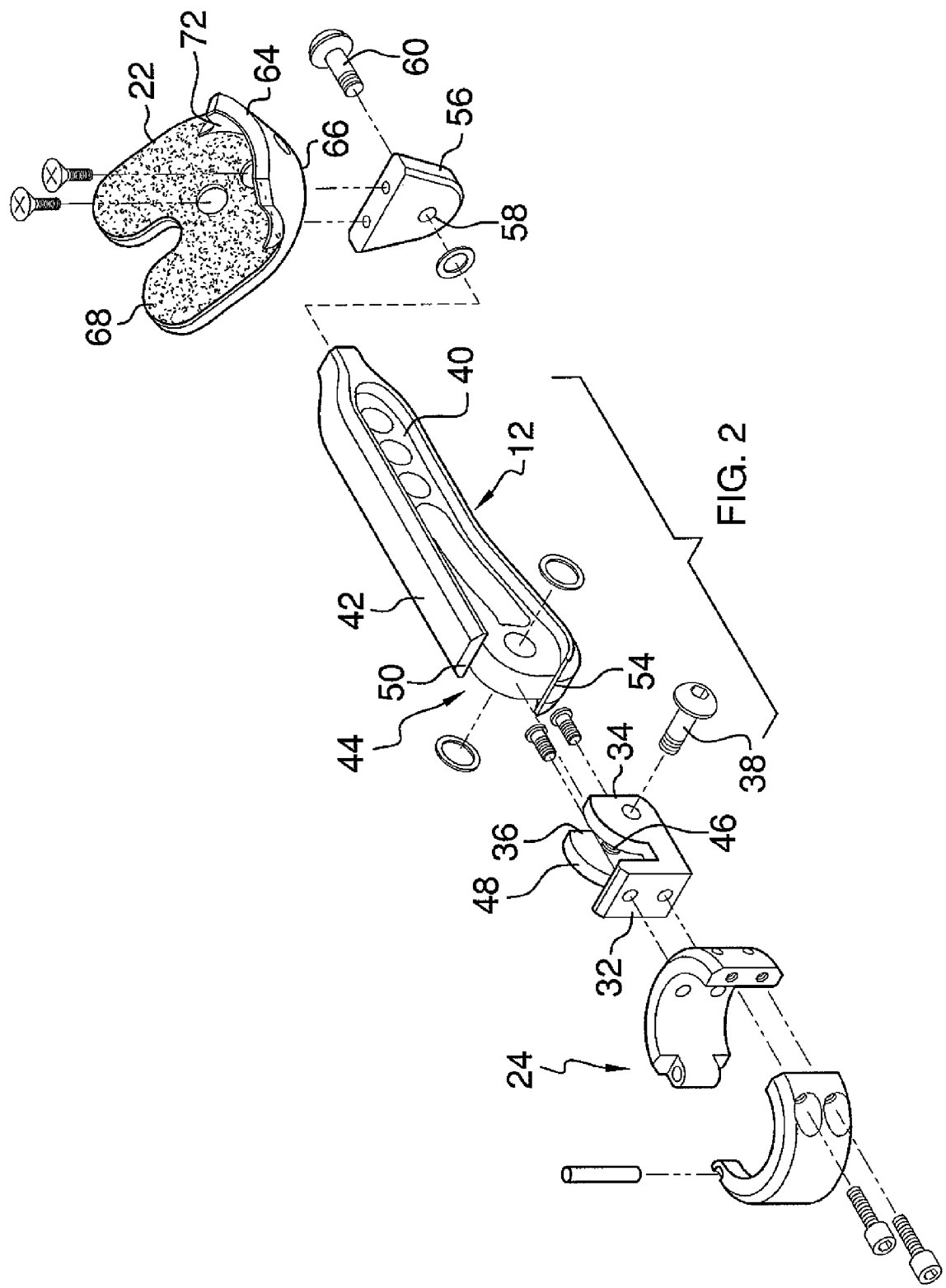
FIG. 2 is an exploded view of an embodiment of the disclosure.
Figure 3:
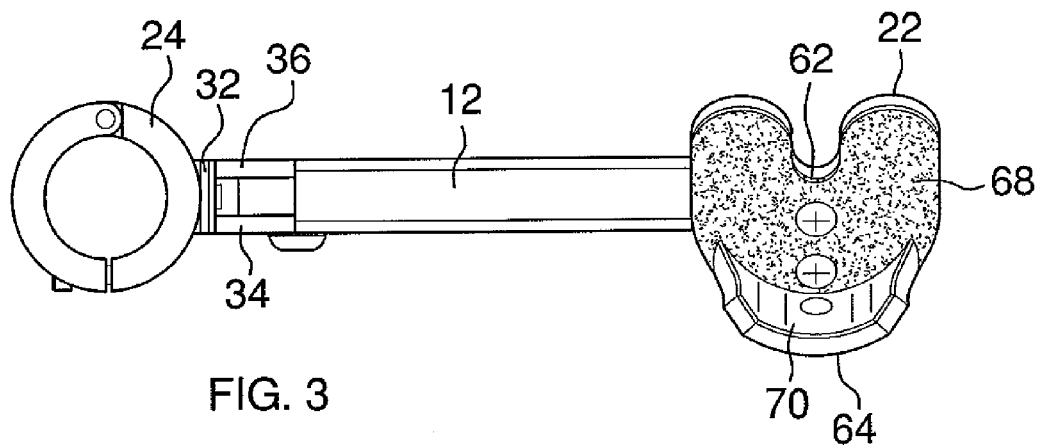
FIG. 3 is a top view of an embodiment of the disclosure.
Figure 4:
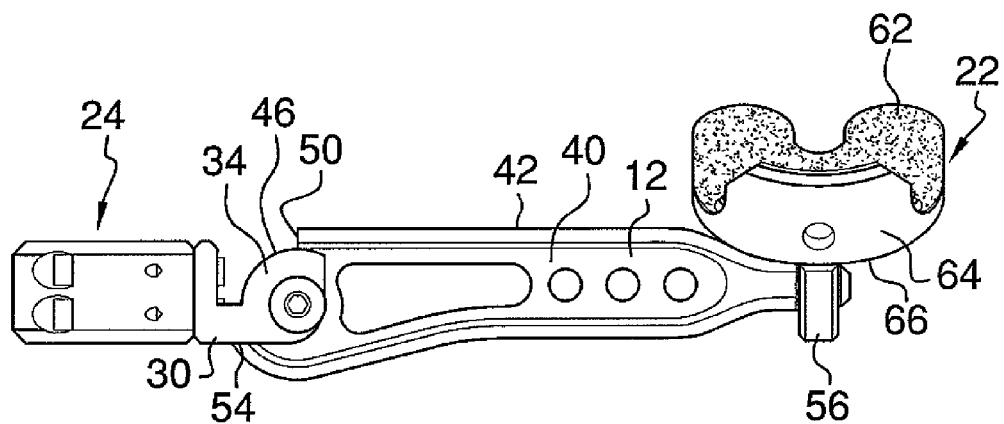
FIG. 4 is a rear view of an embodiment of the disclosure.
Figure 5:
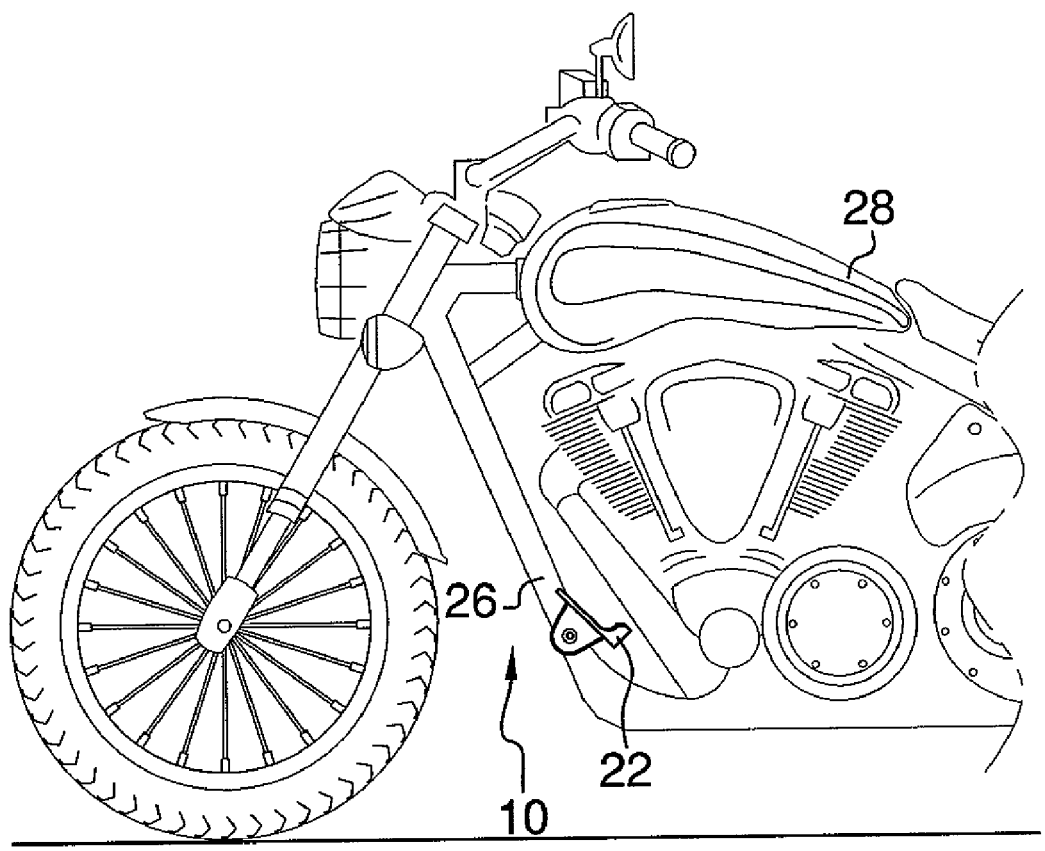
FIG. 5 is a side view of an embodiment of the disclosure in use.

With reference now to the drawings, and in particular to FIGS. 1 through 5 thereof, a new motorcycle foot rest embodying the principles and concepts of an embodiment of the disclosure and generally designated by the reference numeral 10 will be described.

As best illustrated in FIGS. 1 through 5, the adjustable motorcycle foot rest assembly 10 generally comprises an arm member 12 and an arm attachment assembly 14 coupled to a first end 16 of the arm member 12. The arm attachment assembly 14 is designed for coupling to a motorcycle 28. A foot rest attachment assembly 18 is pivotally coupled to a second end 20 of the arm member 12. A foot rest member 22 is coupled to the foot rest attachment assembly 18.

The arm attachment assembly 14 may include a clamping assembly 24 designed for coupling to a tubular portion 26 of the motorcycle 28. The arm attachment assembly 14 includes a saddle member 30 coupled to the clamping assembly 24. The saddle member 30 has a medial portion 32 and a pair of spaced connection portions 34,36 extending outwardly from the medial portion 32. The first end 16 of the arm member 12 is insertable between the spaced connection portions 34,36 of the saddle member 30. An arm pivot pin 38 is insertable through the connection portions 34,36 of the saddle member 30 and the first end 16 of the arm member 12. Thus, the arm member 12 is pivotally coupled to the saddle member 30.

The arm member 12 may have an interior portion 40 and an outer portion 42 extending around the interior portion 40. The outer portion 42 has a gap 44 at the first end 16 of the arm member 12. The interior portion 40 of the arm member 12 has a thickness less than a thickness of the outer portion 42 of the arm member 12. The connection portions 34,36 of the saddle member 30 are spaced to receive the interior portion 40 therebetween by insertion of the connection portions 34,36 through the gap 44 in the exterior portion 42. The connection portions 34,36 each have an arcuate upper surface 46,48. An upper end 50 of the exterior portion 42 of the arm member 12 moves along the arcuate upper surfaces 46,48 as the arm member 12 is pivoted relative to the saddle member 30. The upper end 50 of the exterior portion 42 of the arm member 12 is positioned to abut the connection portions 34,36 of the saddle member 30 when the arm member 12 is pivoted into a storage position. A lower end 54 of the exterior portion 42 of the arm member 12 abuts the saddle member 30 when the arm member 12 is in an extended position. The gap 44 may be sized to permit pivoting of the arm member 12 a range of 75 to 105 degrees between the storage position and the extended position.

The foot rest attachment assembly 18 may include a pivoting member 56 having a pivot member aperture 58. The foot rest attachment assembly 18 may also include a foot rest pivot pin 60 inserted through the pivot member aperture 58 and coupled to the arm member 12. The foot rest pivot pin 60 is aligned with a longitudinal axis of the arm member 12. Thus, the foot rest member 22 pivots in a plane transverse to the longitudinal axis of the arm member 12.

The foot rest member 22 includes a planar sole support portion 62 and an arcuate heel support portion 64 extending upwardly from a rear edge 66 of the sole support portion 62. A non-skid material 68 may cover the sole support portion 62 of the foot rest member 22 and a rubber liner 70 may cover a surface 72 of the heel support portion 64.

In use, the arm member 12 is attached to the motorcycle 28 so that the arm member 12 can pivot as described above. The foot rest attachment assembly 18 is adjusted as desired to allow the user to be able to comfortably position his or her foot on the foot rest member 22 with the heel being supported by the heel support portion 64. When done riding the motorcycle 28, the arm member 12 may be pivoted up into a storage position so that the foot rest member 22 does not protrude from the side of the motorcycle 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An adjustable motorcycle foot rest assembly comprising:
   an arm member;
   an arm attachment assembly coupled to a first end of said arm member, said arm attachment member being adapted for coupling to a motorcycle;
   a foot rest attachment assembly pivotally coupled to a second end of said arm member;
   a foot rest member coupled to said foot rest attachment assembly; and
   said arm attachment assembly including a clamping assembly adapted for coupling to a tubular portion of the motorcycle;
   said arm attachment assembly including a saddle member coupled to said clamping assembly, said saddle member having a medial portion and a pair of spaced connection portions extending outwardly from said medial portion;
   wherein said first end of said arm member is insertable between said spaced connection portions of said saddle member;
   an arm pivot pin insertable through said connection portions of said saddle member and said first end of said arm member whereby said arm member is pivotally coupled to said saddle member;
   said arm member having an interior portion and an outer portion extending around said interior portion;
   said outer portion having a gap at said first end of said arm member;
   said interior portion of said arm member having a thickness less than a thickness of said outer portion of said arm member; and
   said connection portions of said saddle member being spaced to receive said interior portion therebetween by insertion of said connection portions through said gap in said exterior portion.

2. The adjustable motorcycle foot rest assembly of claim 1, further comprising:
   said connection portions each having an arcuate upper surface; and
   wherein an upper end of said exterior portion of said arm member moves along said arcuate upper surface as said arm member is pivoted relative to said saddle member.

3. The adjustable motorcycle foot rest assembly of claim 1, wherein said upper end of said exterior portion of said arm member is positioned to abut said connection portions of said saddle member when said arm member is pivoted into a storage position.

4. The adjustable motorcycle foot rest assembly of claim 1, wherein a lower end of said exterior portion of said arm member abuts said saddle member when said arm member is in an extended position.

5. The adjustable motorcycle foot rest assembly of claim 1, wherein said gap is sized to permit pivoting of said arm member 90 degrees between a storage position and an extended position.

6. The adjustable motorcycle foot rest assembly of claim 1, further comprising:
   said foot rest attachment assembly including a pivoting member having a pivot member aperture; and
   said foot rest attachment assembly including a foot rest pivot pin inserted through said pivot member aperture and coupled to said arm member.

7. The adjustable motorcycle foot rest assembly of claim 6, wherein said foot rest pivot pin is aligned with a longitudinal axis of said arm member whereby said foot rest member pivots in a plane transverse to said longitudinal axis of said arm member.

8. The adjustable motorcycle foot rest assembly of claim 1, wherein said foot rest member includes a planar sole support portion and an arcuate heel support portion extending upwardly from a rear edge of said sole support portion.

9. The adjustable motorcycle foot rest assembly of claim 8, further including a non-skid material covering said sole support portion of said foot rest member.

10. The adjustable motorcycle foot rest assembly of claim 8, further including a liner covering a surface of said heel support portion.

11. An adjustable motorcycle foot rest assembly comprising:
    an arm member;
    an arm attachment assembly coupled to a first end of said arm member, said arm attachment member being adapted for coupling to a motorcycle;
    a foot rest attachment assembly pivotally coupled to a second end of said arm member;
    a foot rest member coupled to said foot rest attachment assembly;
    said arm attachment assembly including a clamping assembly adapted for coupling to a tubular portion of the motorcycle;
    said arm attachment assembly including a saddle member coupled to said clamping assembly, said saddle member having a medial portion and a pair of spaced connection portions extending outwardly from said medial portion;
    wherein said first end of said arm member is insertable between said spaced connection portions of said saddle member;
    an arm pivot pin insertable through said connection portions of said saddle member and said first end of said arm member whereby said arm member is pivotally coupled to said saddle member;
    said arm member having an interior portion and an outer portion extending around said interior portion;
    said outer portion having a gap at said first end of said arm member;
    said interior portion of said arm member having a thickness less than a thickness of said outer portion of said arm member;
    said connection portions of said saddle member being spaced to receive said interior portion therebetween by insertion of said connection portions through said gap in said exterior portion;
    said connection portions each having an arcuate upper surface;
    wherein an upper end of said exterior portion of said arm member moves along said arcuate upper surface as said arm member is pivoted relative to said saddle member;
    wherein said upper end of said exterior portion of said arm member is positioned to abut said connection portions of said saddle member when said arm member is pivoted into a storage position;
    wherein a lower end of said exterior portion of said arm member abuts said saddle member when said arm member is in an extended position;
    wherein said gap is sized to permit pivoting of said arm member 90 degrees between a storage position and an extended position;

said foot rest attachment assembly including a pivoting member having a pivot member aperture;

said foot rest attachment assembly including a foot rest pivot pin inserted through said pivot member aperture and coupled to said arm member;

wherein said foot rest pivot pin is aligned with a longitudinal axis of said arm member whereby said foot rest member pivots in a plane transverse to said longitudinal axis of said arm member;

wherein said foot rest member includes a planar sole support portion and an arcuate heel support portion extending upwardly from a front edge of said sole support portion;

a non-skid material covering said sole support portion of said foot rest member; and a liner covering a surface of said heel support portion.

\* \* \* \* \*